July 7, 1970  R. MEIER  3,518,883
PROCESS FOR MEASURING HIGH TEMPERATURES AND APPARATUS
FOR CARRYING OUT THIS PROCESS
Filed Dec. 27, 1967

INVENTOR
ROLF MEIER
BY
ATTORNEYS

United States Patent Office 3,518,883
Patented July 7, 1970

3,518,883
PROCESS FOR MEASURING HIGH TEMPERATURES AND APPARATUS FOR CARRYING OUT THIS PROCESS
Rolf Meier, Mol, Belgium, assignor to European Atomic Energy Community (Euratom), Brussels, Belgium
Filed Dec. 27, 1967, Ser. No. 694,013
Claims priority, application Germany, Jan. 12, 1967, E 33,192
Int. Cl. G01k 7/04
U.S. Cl. 73—359                        8 Claims

ABSTRACT OF THE DISCLOSURE

A method and apparatus for measuring high temperatures by determining the change in electrical characteristics of a wire affected by the high temperature. A length of cold-worked electrically conductive metal wire is exposed to heat and placed in a differential thermocouple circuit with each end in a different temperature zone. The thermoelectric voltage developed is measured to determine the unknown high temperature to which the wire has been exposed.

---

The invention relates to a process for measuring high temperatures and to an apparatus for carrying out this process by means of a cold-worked length of electrically conductive wire, which is first brought to a region at the temperature to be measured and then examined in respect to its thermoelectric voltage.

In the French Pat. No. 1,460,458, there is disclosed a temperature measuring process in which a length of previously cold-worked metal wire is brought into a region at the temperature to be measured, so the crystal changes caused by working are partly "healed" or restored. The degree of healing is, in a certain temperature range specific to each metal or alloy, proportional to the temperature during healing, so that it is possible to determine the temperature reached during healing from the degree of healing.

A temperature measuring process of this type is particularly advantageous for radiation experiments in a nuclear reactor, since only one or more lengths of wire are present in the measuring area during radiation, i.e. no connecting wires or complicated electronic instruments are present. Obviously, it cannot be used to monitor variations in the temperature during operation, but only after removal of the test wire from the measuring area, to determine or indicate the temperature which was reached in the measuring area.

The process for evaluating the degree of healing in accordance with the patent mentioned above consists in measuring the thermoelectric voltage of the wire while a very steep temperature gradient with a maximum temperature far above the measuring temperature is being produced along the wire. All crystalline changes arising from working are healed, and the thermoelectric voltage produced is proportional to the remaining healing and therefore substantially inversely proportional to the original temperature which was to be measured.

Difficulties have been found in practice in operating this process since the thermoelectric voltage, being of the order of a few microvolts, can only be measured with very sensitive instruments and since with a length of wire which has undergone nuclear radiation it is very difficult to achieve precise relative movements between the wire and the oven producing the temperature gradient.

The invention is intended to overcome or reduce these disadvantages by determining the degree of heating by static measurement, i.e. without moving the indicator wire. The process according to the invention consists in that the length of wire is examined in a differential thermocouple circuit in such a way that its two ends are brought to selected, different temperatures and connected to two annealed lengths of wire having the same chemical composition as the first length of wire, and the thermoelectric voltage of this circuit is determined to provide a measure of the temperature to be determined.

Preferably, the higher of the two temperatures during examination is low enough for no appreciable annealing effect to occur during examination, and the lower of the two temperatures is substantially below the ambient temperature.

The process embodying the invention, therefore, is based mainly on the measurement of the change, after heating to the temperature which is to be determined, in the absolute thermoelectric force of the wire in a differential thermocouple circuit; the two reference wires in the circuit are selected from annealed material having the same composition as the indicator wire. If the two reference temperatures are low enough, there is no annealing effect during the final examination so that no measuring errors arise on that account.

The invention also provides an apparatus for use in measuring high temperatures and comprising an indicating length of cold-worked electrically conductive metal wire which has been subjected to the temperature to be measured, two lengths of annealed wire of the same composition as the indicating wire and connected respectively at one end thereof to the two ends of the indicating wire, means for maintaining the said two connections at substantially different temperatures and means for measuring voltage differences at the other ends of the two lengths of annealed wire.

These features of the invention, and other features relating to the arrangement for evaluating the heated wires, will now be described in more detail, and by way of example, with reference to the accompanying three figures, in which.

As in the prior process above-mentioned, the measuring process proper consists of two separate steps, separated by practically any length of time. The first step, in both the process embodying the invention and the known process, consists in attaching the previously cold-worked wire, whose thermoelectric behaviour is known, to the article whose temperature it is to acquire. This temperature will be designated $T_x$ and must act on the wire for a sufficient length of time to achieve stability. The crystalline changes caused in the wire by cold-working will then have healed to some extent. When the wire is removed from the article it is in effect storing the information as to the previous maximum temperature, in the form of its state of healing. In the second step in the process, which embodies the present invention, this degree of healing is determined, two lengths of wire being inserted in an evaluation circuit (FIG. 1) by, for example, soldering or clamping.

The circuit is a differential thermocouple circuit, with the indicator wire 1 as the central component in the circuit. The two ends of this length of wire 1 are each connected to ends of reference wires 2, 3; the junctions are held at two definite temperatures $T_1$ and $T_2$ as far apart as possible. However, the higher temperature is still low enough to prevent any substantial further healing from occurring in the indicator wire 1. The other ends of the reference wires 2, 3 are connected in a common temperature field with a temperature $T_3$ to the lead-in wires of a galvanometer 4. The voltage measured in the galvanometer is therefore, if the temperatures $T_1$, $T_2$ are constant, dependent only on the difference in the crystal structure of the indicator wire and reference wires. If the reference wires have previously been thoroughly annealed, the galvanometer gives an indication of the degree of healing of the indicator wire.

Figure 3:
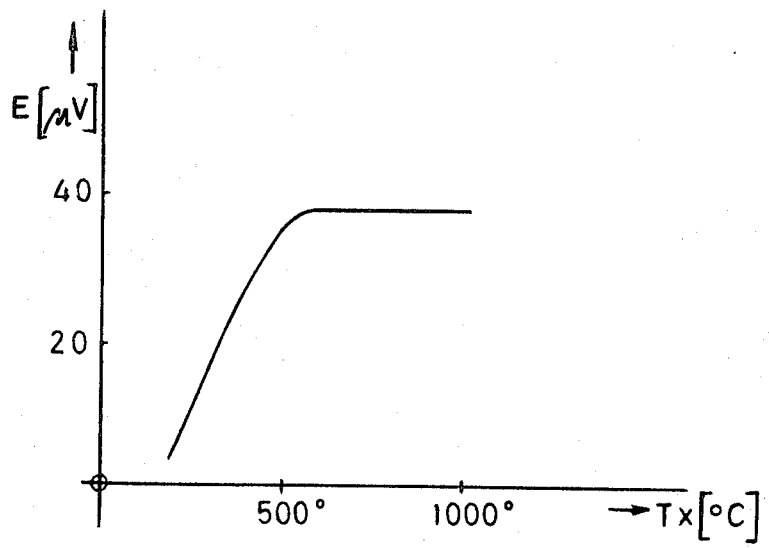
FIG 3 shows a calibration curve for the apparatus in FIG. 2.

FIG. 3 shows a typical calibration curve for platinum wire. It shows that measurements between 200 and 500° C. can be carried out with platinum wire. Preferably, a fairly large batch of wire is always pre-worked together in one operation, and a few lengths of wire are withdrawn from the batch to determine the calibration curve. The remainder of the batch can then be cut into small lengths and used for the measurements.

Figure 1:
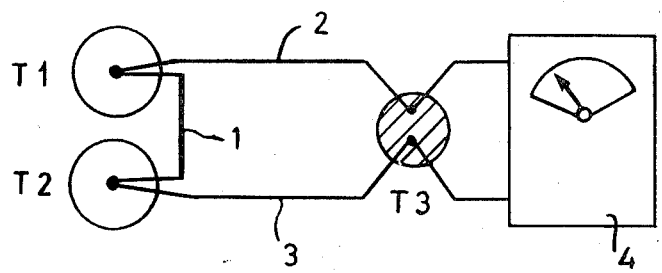
FIG. 1 shows a basic circuit diagram for the apparatus embodying the invention.
Figure 2:
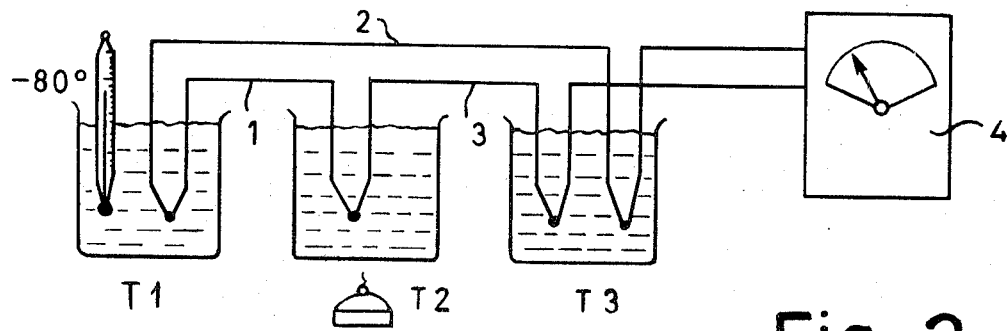
FIG. 2 shows an embodiment diagrammatically.

FIG. 2 shows diagrammatically apparatus in accordance with the circuit diagram in FIG. 1, like parts having like reference numerals. The length of the indicator wire 1 must be such as to ensure that its two ends will reach into the baths at temperatures $T_1$, $T_2$. However, the wire must not be longer than necessary, since its entire length should heat evenly to the temperature which is to be determined. (Obviously, only an average for the degree of healing over the entire length of wire can be found.) For the temperature baths in the laboratory, a freezing mixture of carbon dioxide snow with acetone at −80° C. was used for the temperature $T_1$ and boiling water at 100° C. for the temperature $T_2$. The temperature $T_3$ is not critical for the measurement, since its importance is only to ensure that the two junctions between the platinum reference wires and the galvanometer lead-ins are at the same temperature. The bath at temperature $T_3$ may therefore be an insulating oil at the ambient temperature.

The embodiment shown represents only one possible realisation of the invention. In particular, the choice of the material for the indicator and reference wires is determined only by the measuring range desired. The lead-ins for the galvanometer may be of the same or some other conductive material. Usually they are of copper.

I claim:

1. A process for measuring high temperatures by means of a cold-worked length of electrically conductive wire, which wire is first brought to a region at the temperature to be measured and then examined in respect of its thermoelectric voltage, comprising placing the length of wire to be examined in a differential thermocouple circuit in such a way that its two ends are brought to selected, different temperatures and connected to two annealed lengths of wire having the same composition as the first length of wire, and determining the thermoelectric voltage of this circuit to provide a measure of the temperature to be determined.

2. A process as claimed in claim 1, in which the higher of the two temperatures during examination is low enough for no appreciable annealing effect to occur during examination, and the lower of the two temperatures is substantially below the ambient temperature.

3. An apparatus for use in measuring high temperatures comprising an indicating length of cold-worked electrically conductive metal wire which has been subjected to the temperature to be measured, two lengths of annealed wire of the same composition as the indicating wire and connected respectively at one end thereof to the two ends of the indicating wire, means for maintaining the said two connections at substantially different definite temperatures, and means for measuring voltage differences at the other end of the two lengths of annealed wire.

4. An apparatus as claimed in claim 3 in which said means for maintaining said connections at substantially different temperatures comprises first and second baths providing temperature zones for said ends of the wire, one bath containing a freezing mixture and the other a boiling mixture.

5. An apparatus as claimed in claim 4 in which said freezing mixture is carbon dioxide snow with acetone at −80° C. and said boiling mixture is water boiling at 100° C.

6. An apparatus as claimed in claim 3 further comprising a galvanometer connected to the other ends of said two lengths of annealed wire.

7. An apparatus according to claim 6 further comprising a bath filled with an electrically insulating liquid at substantially ambient temperature, said connections between the two annealed lengths of wire and said galvanometer being immersed in said bath.

8. An apparatus as claimed in claim 3 in which the lengths of wire consist of platinum and the measuring temperature range is between 200 and 500° C.

References Cited

FOREIGN PATENTS 1,460,458  12/1966  France.

LOUIS R. PRINCE, Primary Examiner

D. E. CORR, Assistant Examiner

U.S. Cl. X.R.

73—339